4 Sheets, Sheet 1.
A. Paget,
Ships Implement.
No. 4,324. Reissued Apr. 4, 1871.
Fig. I.B.
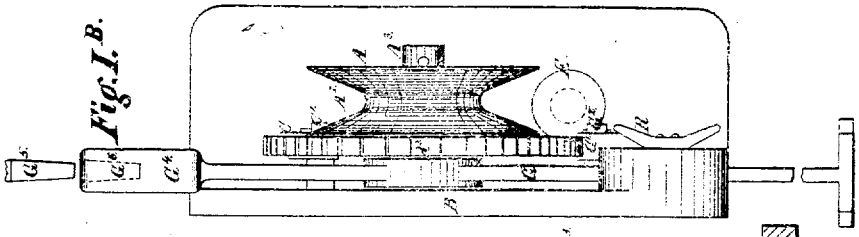
Fig. I.A.
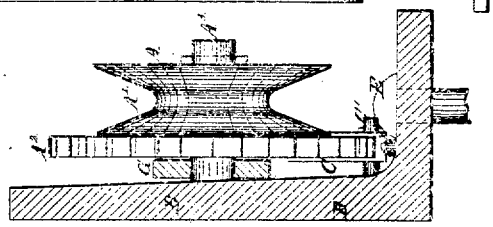
Fig. I.
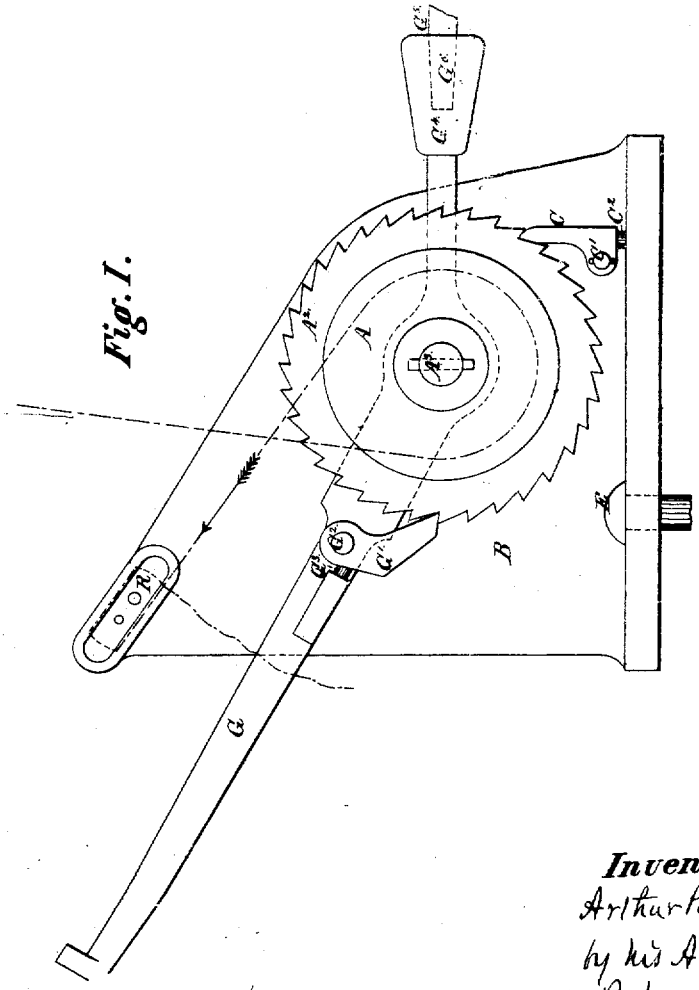
Witnesses.
Thos. B. Kerr
R. C. Greenhalgh
Inventor.
Arthur Paget,
by his Attys.
Bakewell & Christy.
N. PETERS, PHOTO-LITHOGRAPHER, WASHINGTON, D. C.

114. SHIPS,
Improvements,
Rigging.
Examiner.
4 Sheets. Sheet 2.
A. Paget,
Ships Implement.
No. 4,324. Reissued Apr. 4. 1871.
Fig. III.A.
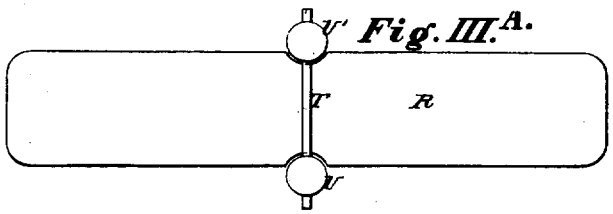
Fig. III.
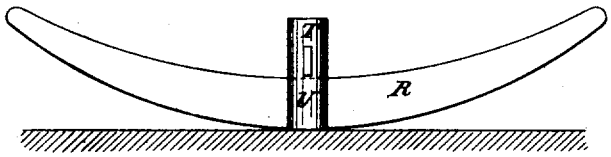
Fig. II.C.
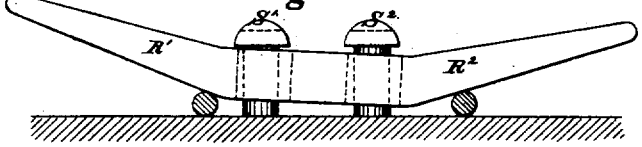
Fig. II.B.
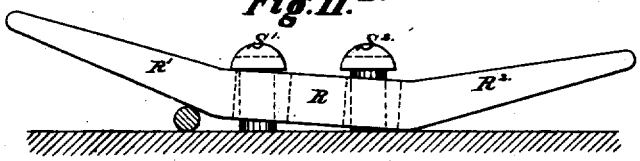
Fig. II.
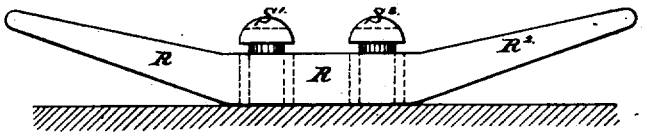
Fig. II.A.
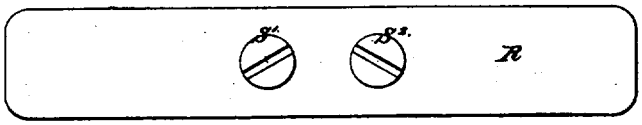
Witnesses. } Thos Pellerr
R. C. Hrenshaw
Inventor.
Arthur Paget,
by Bakewell & Christy, his Att'ys
N. PETERS, PHOTO-LITHOGRAPHER, WASHINGTON, D. C 4 Sheets. Sheet 3.
A. Paget,
Ships Implement.
No. 4324. Reissued Apr. 4. 1871.
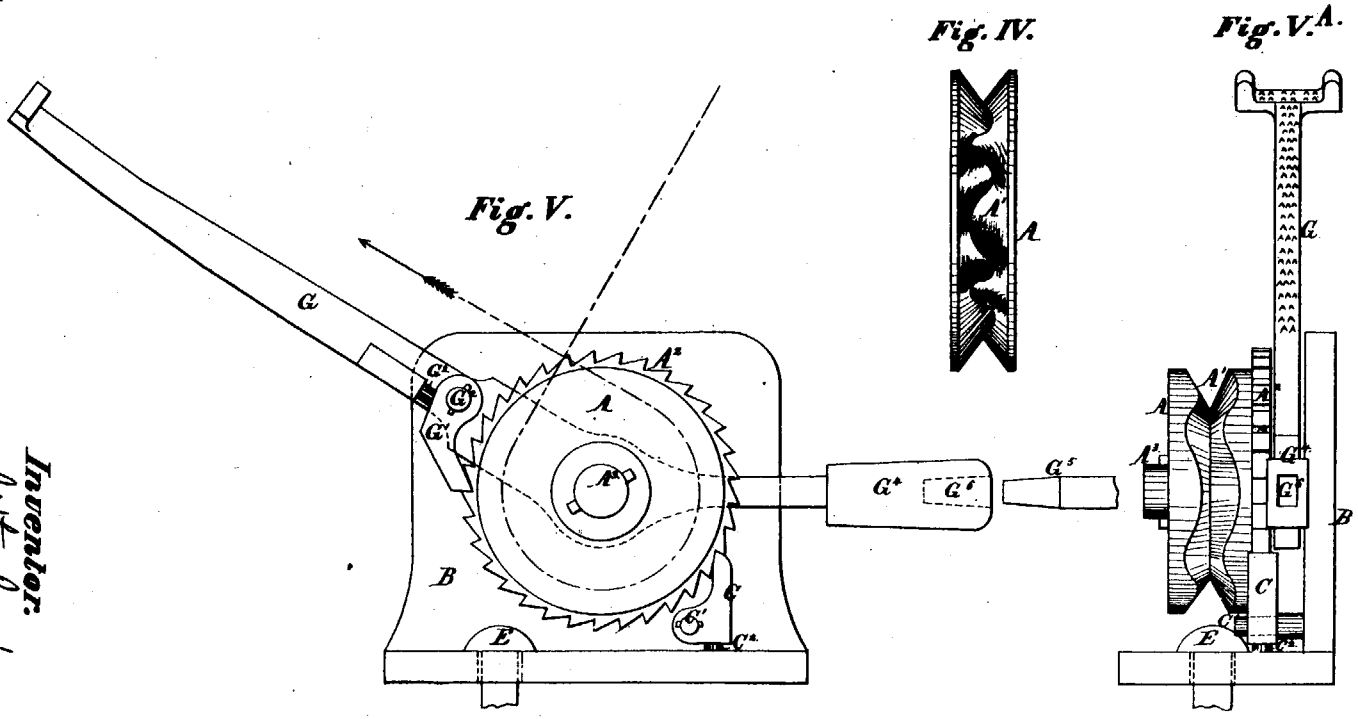
Witnesses.
Thos. B. Kerr
R. C. Minshaw
Inventor.
Arthur Paget,
by Bakewell & Johnsky, his Attys.
H. PETERS, PHOTO-LITHOGRAPHER, WASHINGTON, D. C.

14. SHIPS.
Examiner.
4 Sheets. 4 Sheet.
A. Paget,
Ships Implement.
No. 4324 Reissued Apr. 4. 1871.
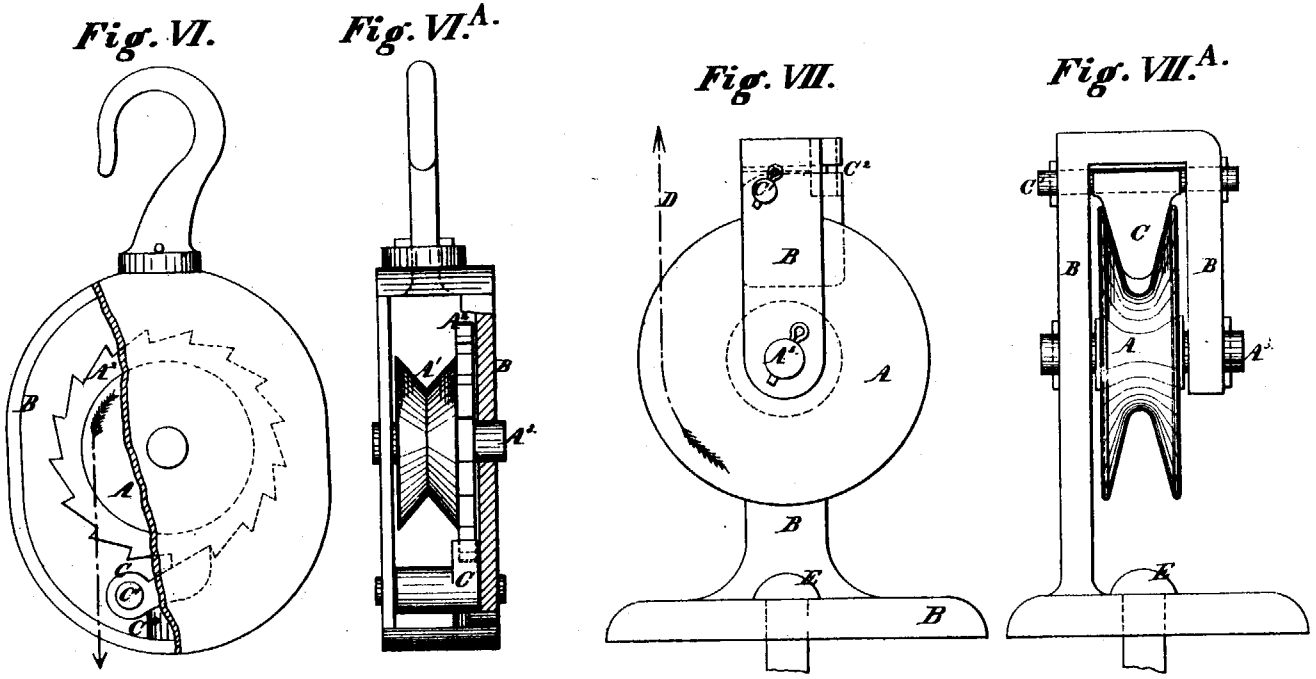
Witnesses. } Thos B Kerr
R B Wrenshall
Inventor.
Arthur Paget,
by Bakewell & Christy, his Attys
N. PETERS, PHOTO-LITHOGRAPHER, WASHINGTON, D. C.

United States Patent Office.

ARTHUR PAGET, OF LOUGHBOROUGH, ENGLAND.

Letters Patent No. 105,240, dated July 12, 1870; antedated April 21, 1868; reissue No. 4,324, dated April 4, 1871.

IMPROVEMENT IN MACHINES FOR TIGHTENING ROPES, &c.

The Schedule referred to in these Letters Patent and making part of the same.

*To all whom it may concern:*

Be it known that I, ARTHUR PAGET, of Loughborough, in the county of Leicester, England, have invented a new and useful improved Machine or Apparatus for Hauling, Tightening, Holding, and Loosening Ropes, Cords, Chains, &c.; and I do hereby declare the following to be a full, clear, and exact description thereof, reference being had to the accompanying drawing and to the figures and letters marked thereon; that is to say—

My invention consists in the construction of a machine for the hauling, tightening, or pulling of ropes, &c., the principal features of which consist, first, in combining a ratchet-wheel, holding-pawl, tightening-pawl, and lever with a pulley having a V-groove, or a groove of other equivalent form, wherein the opposite sides of the groove shall take a bite on the rope or cord to be wound or tightened thereby, and also in combining with such a pulley a fixed holding-pawl or silent or friction-ratchet only.

Another main feature consists in the use of a cleat of peculiar construction, to be hereafter described, for securing the rope after it has been hauled by the before-mentioned ratchet-pulley.

Figures 1 $1^a$ and $1^b$, on Sheet I of the accompanying drawing, show, respectively, a front elevation, a sectional side elevation, and a plan of my improved apparatus.

A is a pulley, with a V-groove, $A^1$, on which is fixed or formed a ratchet-wheel, $A^2$, and which runs on an axle, $A^3$, fixed to the framing B.

In gear with the ratchet-wheel $A^2$ is a retaining-ratchet or pawl, C, on a pin, $C^1$, fixed to the framing, and acted upon by a spring, $C^2$, of India rubber or other suitable material, or by a weight.

By this arrangement it will be seen that if a rope be passed partly round the pulley A it will be easily pulled by an operator, in the direction of the arrow, against a pressure, weight, or tension; but such weight, pressure, or tension will not easily pull the rope against the operator in the opposite direction to the arrow; whereby an operator will be enabled with ease to tighten a rope to a great degree, and when so tightened he can easily secure the rope in the cleat R in a manner hereafter described.

It will also be seen that when the operator desires to slack off or pay out the rope, if he releases his end of the rope the tendency of the rope to wedge itself into or press against the groove $A^1$ will cease or be lessened, and the rope can then be drawn in the opposite direction with ease, and thus be entirely under control of the operator in all ways.

Upon the axle $A^3$ may be mounted a lever, G, carrying an acting-ratchet or pawl, $G^1$, on an axle, $G^2$, in gear with the ratchet-wheel $A^2$, the pawl being kept in gear by a spring, $G^3$, or weight.

By means of this lever the operator will be, by its use, enabled, when he has drawn the rope as tight as he can with his hands, then to obtain a greatly increased power or leverage to tighten or haul the rope, if requisite, by forcing round the pulley by the depression of the lever G with his foot or hand, or by elevating the other end, still pulling the rope with his hand.

The lever is raised again for repeated action by means of the counterweight $G^4$ or other convenient means.

If desired, still greater power for hauling or tightening may be applied by the insertion of a removable lever or handle, $G^5$, into a socket, $G^6$, formed in the counterweight $G^4$; or the lever may be formed with a socket to fit into the other end of the lever G.

It will also be seen that the operator can easily slack off or pay out, and can again hold or tighten the rope at pleasure; and it is found that with this apparatus one man can tighten or control a rope better than ten men with an ordinary pulley.

The basement or framing B of the apparatus may be secured to the floor or deck by a bolt or pin, E, on which the basement will then be free to swivel, and thus to be adjusted in position for receiving a rope or chain from any quarter.

Figures 2 $2^a$ $2^b$ and $2^c$, Sheet II, show enlarged views of my improved construction of the cleat R for securing the rope, chain, or other mechanical equivalent after having been tightened in the above-described manner; but which construction of cleat may also be employed with equal advantage for holding or making fast ropes, &c., generally, irrespective of its combination with the before-described apparatus.

The cleat R may be held by two bolts or screws $S^1$ and $S^2$ in such a manner that it is free to alter its position, to a certain extent, relatively to the base or foundation or floor to which the bolts or screws are secured, as shown in fig. 2.

If, now, a rope desired to be held be placed in the cleat, under the horn at $R^1$, it will cause the horn $R^1$ of the cleat to tilt up or open out to the position shown in fig. $2^b$; and if the free end of the rope be then laid in the cleat and drawn down under the horn $R^2$, it will operate both with a wedging action and with a powerful leverage in forcing the cleat upward toward the position shown in fig. $2^c$; and will thus cause the cleat to hold the rope so that it may be pulled until it is broken before it will slip or release itself; but, when desired, the releasing of the rope may be easily and instantaneously effected by withdrawing the last-laid end of the rope from under the horn $R^2$, which will, by allowing the horn $R^2$ to descend and the horn $R^1$ to ascend, release the rope entirely.

At Figures 3 and $3^a$ the cleat R is shown formed with curved ends or horns instead of straight ones, as in the previous arrangement, and may be held by a single fulcrum of any sort; as, for example, by a cotter, T, passing through two pins U and U′, situated on each side of the cleat, which fit into notches formed in the latter, as shown in the plan at fig. $3^a$, so as to hold it in position.

By making the cotter tapering, and driving it farther or less far through the pins, when the rope has been laid in both ends of the cleat, as before described, a still greater or a decreased hold on the rope may be effected. It may also serve to adjust the cleat, in the first instance, according to the size of the rope to be laid in it.

In place of a cotter a pin may also be employed, passing either through or over the cleat, or in a boss under the cleat, and into cheeks on either side.

Instead of forming the pulley A of the before-described apparatus, with a plain V-groove, as shown, it may, if increased holding or retaining power be required, be formed with a corrugated V-groove, the corrugations being either made to increase gradually from the periphery of the pulley toward the bottom of the groove, as shown at Figure 4, Sheet III; or they can be made greatest at the periphery and decreasing toward the bottom of the groove, as indicated in the modified arrangement of my apparatus, shown in front and side elevations at Figures 5 and $5^a$.

These corrugated grooves can be made, if desired, to afford such a firm hold on the rope that it cannot slip back if laid round a large portion of the circle of the groove, even when the slack end is released by the hand; but it may still be capable of being eased off if released from a portion of the circle of the groove; and as the pulley A is prevented by the pawl C from turning back, the cleat described in the first arrangement for securing the rope may, if desired, in that case be dispensed with.

In connection with the above-described arrangements of pulleys with corrugated V-grooves I wish to remark that I am aware that it has already been proposed to make raised ribs or notches alternately in the opposite sides of V-grooves or pulleys for the purpose of more firmly holding the rope or chain, as described in the specification of Povah's English patent, No. 1,675, of 1860; but such an arrangement would be liable to cause an abrasion of the rope and jerking of a chain, and by it the rope or chain would be held only at certain intervals instead of at the whole of that part of the circle of the groove in which it is laid, which defects are avoided by making the entire surface of the groove corrugated, according to my present invention.

It will be evident that my before-described apparatus for the hauling, tightening, or pulling of ropes, &c., may be variously modified according to the purposes to which it is to be applied. Thus, if it is to be employed in the manner first described—that is, simply as a retaining or holding-pulley—it may take the form as shown in Figures 6 and $6^a$, Sheet IV, showing respectively a side and front elevation, partly in section, of a pulley-block, having a pulley, A, with a single V-groove, $A^1$, the angle of which may be varied as desired to give different degrees of retaining power and facility of overhauling, and which may or may not be corrugated as before described.

It will be observed that the groove in all the forms shown is of such a shape that, if an ordinary ship's rope be passed around them, the sides of the groove will take a secure bite on such rope; or, in other words, the rope, by the strain on it, will be wedged into the groove, so that a single person can the more easily and readily operate it. And as celerity and certainty in the handling of ropes on shipboard is frequently of vital importance to the safety of lives and property, the value of the improvement described will be obvious.

In this respect the grooved pulley described differs from the ordinary windlass.

To the side of A is made or attached a ratchet-wheel, $A^2$; and it also has an axle, $A^3$, which revolves in holes or bearings in the frame or block B; or, if preferred, $A^3$ may be fixed in B and A may revolve on it.

C is a ratchet or pawl taking into the ratchet-teeth of $A^2$, and $C^1$ is the axle of C, free to revolve in holes or bearings in the frame or block B; or, if preferred, $C^1$ may be fixed in B and C may revolve on it.

$C^2$ is a spring of India rubber or any suitable material, keeping C in gear with the teeth of the ratchet-wheel $A^2$ in whatever position it may be placed.

Another modification of this simple form of my apparatus, as applied to a snatch-block, is shown in front and side elevation at Figures 7 and $7^a$, in which arrangement a description of ratchet known as "silent," "friction," or "pressure"-ratchets may be applied, as shown, in place of the ordinary ratchet-wheel and pawl—A being the grooved wheel and $A^3$ its axle, C being the before-mentioned silent, friction, or pressure-ratchet, $C^1$ its axle, and $C^2$ its spring of India rubber or other suitable material, B being the frame of the pulley or block, and E being a holding-down bolt or pin, on which the whole apparatus can swivel or pivot.

This arrangement will be found, among other uses, very advantageous for halyards, as it will be seen that, when the bolt is secured to the deck or floor and a rope is passed under the pulley, it will give very great power of control to an operator pulling the rope upward in the direction of the arrow D.

It will be easily seen that this plan of the ratchet can also be applied to the block shown in figs. 6 and $6^a$; or the ratchet there shown can be applied to this form of snatch-block if desired.

Having thus described the nature of my invention and in what manner the same is to be performed, I wish it to be understood that I do not limit myself to the precise arrangements thereof as shown on the accompanying drawing, as these may be variously modified without departing from the essential features of my invention; but

What I claim is—

1. A ratchet-pulley having a groove, the sides of which, when in use, shall take a bite on the rope, cord, or chain to be operated therein, in combination with a fixed holding-pawl and lever or levers, carrying a pawl in gear with the ratchet of the grooved pulley, arranged and operative substantially in the manner set forth.

2. A ratchet-pulley having a groove, the sides of which, when in use, shall take a bite on the rope, cord, or chain to be operated therein, in combination with a fixed holding-pawl or its equivalent, arranged with reference to the grooved ratchet-pulley, substantially as described.

3. The arrangement of cleats or apparatus for holding or making fast ropes, cords, strings, or other mechanical equivalents, wherein such cleats are held by one or more bolts or pins or other convenient fulcrum or fulcrums in such manner as to act with shifting, variable, or differential leverage, and at variable angles upon the rope, substantially as described.

In witness whereof I, the said ARTHUR PAGET, have hereunto set my hand.

ARTHUR PAGET.

Witnesses:

CHAS. D. ABEL,
THOS. C. TAYLOR.